United States Patent [19]

Tozzi

[11] 3,723,807

[45] Mar. 27, 1973

[54] AUTOMOTIVE HEADLAMP DELAYED OFF DEVICE

[75] Inventor: Joseph Tozzi, Lafayette Hills, Pa.

[73] Assignee: Philco-Ford Corporation, Philadelphia, Pa.

[22] Filed: Nov. 26, 1971

[21] Appl. No.: 202,436

[52] U.S. Cl. ................................................315/83
[51] Int. Cl. ...............................................B60q 1/04
[58] Field of Search.................................315/82, 83

[56] References Cited

UNITED STATES PATENTS 3,546,527  12/1970  Chunn et al............................315/82
3,628,085  12/1971  Brock.....................................315/82

Primary Examiner—John Kominski
Assistant Examiner—James B. Mullins
Attorney—Robert D. Sanborn

[57] ABSTRACT

A delayed-off headlamp circuit in which the delay feature is invoked only within a predetermined time interval after the ignition is turned off. Otherwise headlamp operation is normal. This permits the user to invoke a delay when he desires it but is not bothered by an undesired delay otherwise.

5 Claims, 1 Drawing Figure

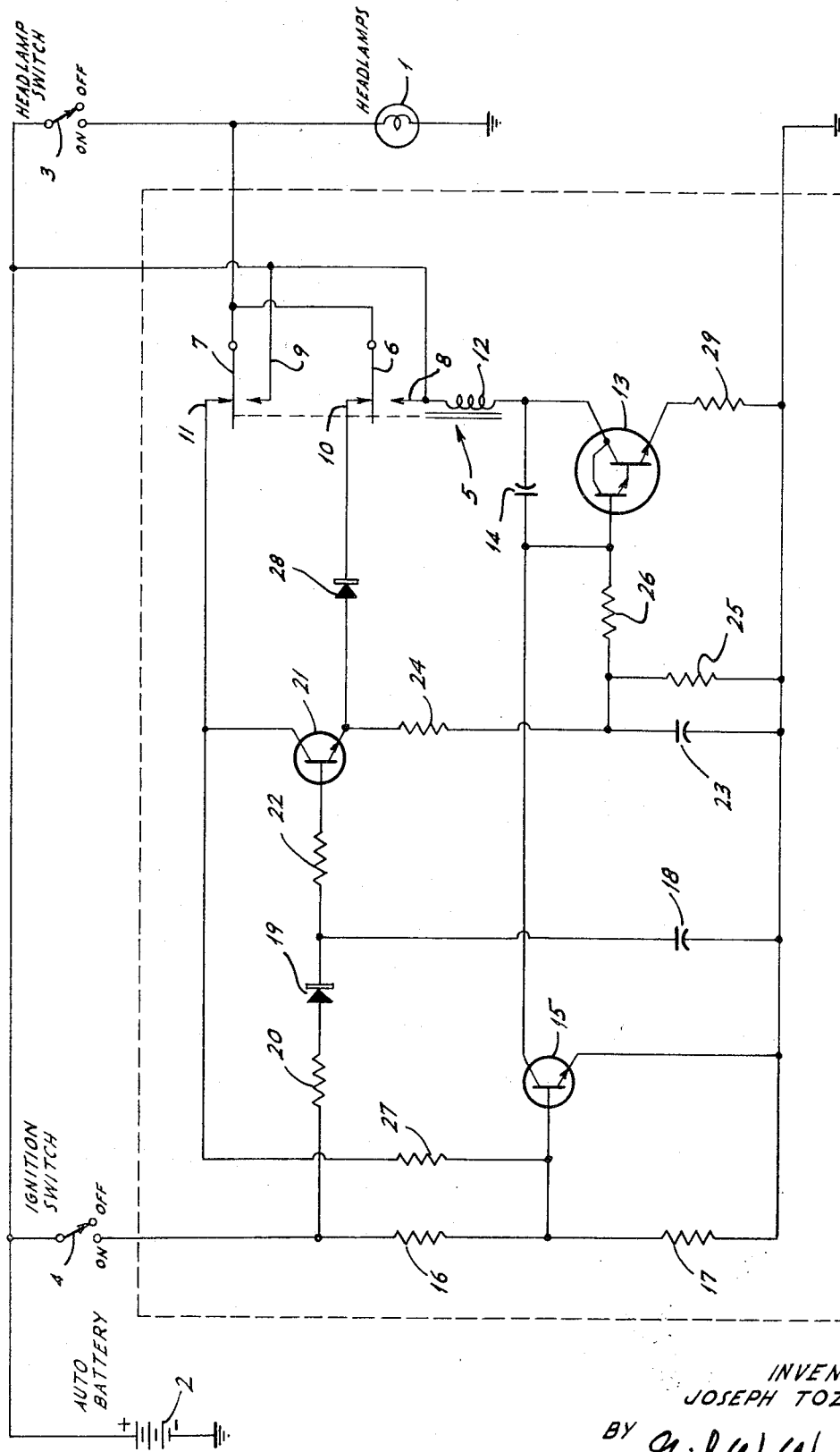

3,723,807

AUTOMOTIVE HEADLAMP DELAYED OFF DEVICE

BACKGROUND OF THE INVENTION

Under certain conditions it has proven desirable and useful to incorporate a delayed off characteristic into light switches. This permits the user to turn the switch off and then perform some desired function, task, or procedure before the light goes out. In an automobile the delayed off feature is often applied to the headlamps. After parking the headlamps can be switched off but illumination remains for a half minute or so to enable the driver to reach a doorway, close the garage door, or other such activity, or have the sidewalk, street or driveway illuminated for safe walking.

In some prior systems the delay feature is merely incorporated into the headlamp switch but when the feature is not desired it can be an annoyance. Accordingly a separate switch can be incorporated to provide the delayed off feature.

In other prior systems, in order to avoid adding an extra switch which would complicate the control panel, the delay feature has been incorporated into the regular ignition switch. So long as the ignition switch is turned on the headlamps operate normally, and, no delay on turn-off involved. If a delay is desired the operator turns the ignition off first. Thereafter, when the headlamps are turned off, the delay feature is present. With such a system, the delayed off action will occur each time the headlamps are operated.

SUMMARY OF THE INVENTION

It is an object of the invention to provide a delayed off headlamp provision in an automotive system.

It is a further object to invoke the delayed off feature only when the ignition is turned off first.

It is a still further object to invoke the delayed off feature only during a predetermined time interval after the ignition is turned off. Otherwise headlamp operation is normal.

These and other objects are provided by incorporating an electronic timing circuit that disables the delayed off feature a predetermined time after the ignition switch is turned off.

BRIEF DESCRIPTION OF THE DRAWING

The single FIGURE of the drawing is a schematic diagram of the preferred circuit of the invention.

DESCRIPTION OF THE CIRCUIT

In the FIGURE the elements outside the dashed rectangle are conventional automobile components. The headlamps 1 are shown in simplified form. They would ordinarily include high-low beam filaments, a high-low beam selector switch and an off-on relay which are not shown. The headlamps are operated by the automobile battery 2 through an off-on switch 3. Headlamp operation is normally independent of the position of ignition switch 4.

The delay system is switched by means of double-pole double-throw relay 5. Movable contacts 6 and 7 are connected to the headlamps 1. Fixed contacts 8 and 9, which are made when relay 5 is energized, are connected to the battery 2. Fixed contacts 10 and 11, which are made when relay 5 is deenergized, connect to diode 28 and transistor 21, respectively of the delay circuit. Coil 12 of relay 5 operates the relay from a Darlington-connected transistor 13 which functions as a high-gain NPN transistor. Capacitor 14 provides negative feedback around transistor 13 to suppress switching transients. A positive voltage at the input base of transistor 13 will turn it on and operate relay 5 whereas a zero or negative base voltage will turn transistor 13 off leaving the contacts of relay 5 in the deenergized position as shown.

Reference is first made to circuit conditions which obtain with headlamp switch 3 in its "off" position. When ignition switch 4 is turned to the "on" position, positive voltage from the battery 2 is applied to the base of transistor 15 by way of resistors 16 and 17 which act as a voltage divider. This bias turns transistor 15 on thereby returning the input base of transistor 13 to ground so that transistor 13 is turned off. Whenever transistor 15 is on transistor 13 will be off, the contacts of relay 5 will be as shown, and headlamp switch 3 will operate headlamps 1 normally. The ignition switch 4 "on" position will also permit capacitor 18 to charge through diode 19 and resistor 20 to almost battery voltage. Resistor 20 is of low enough resistance that the charging time constant is quite fast (a fraction of a second or so). The charge on capacitor 18 keeps transistor 21 forward biased thru diode 28 and headlamps 1. The base voltage of transistor 21 is about 1.2 volts at this time and the charge on capacitor 23 is approximately 0.5 volt. Resistor 22, also of relatively small resistance value, serves to limit the base current of transistor 21.

If the headlamp switch 3 is now turned to the "on" position, battery voltage is also applied to the collector of transistor 21 by way of relay contacts 7 and 11. At the same time, application of headlamp voltage to the cathode of diode 28, by way of relay contacts 6 and 10, serves to back-bias diode 28. This removes headlamps 1 from the emitter circuit of transistor 21 and leaves in such circuit only resistor 24 and capacitor 23 (together with circuit elements in parallel with capacitor 23). In consequence, capacitor 23 charges almost to full battery voltage. The charging time constant is made short (a fraction of a second) by employing a relatively small resistance value for resistor 24. For the conditions described thus far, the headlamp switch will operate the headlamps normally, that is, without delay. If the headlamp switch 3 is turned off, it can be seen that capacitor 23 will quickly discharge through the series combination of resistor 24, diode 28, relay contacts 10 and 6, and the headlamps 1. Thus the charge on capacitor 23 reflects the on-off state of the headlamps.

If the headlamp switch 3 is in the "off" position (capacitor 23 discharged) and the ignition switch 4 is turned "off", the positive voltage by way of resistors 16 and 17 is removed from transistor 15. For this condition if the headlamps are switched on battery voltage is applied to resistor 27 by way of relay contacts 7 and 11. This will turn transistor 15 on thereby holding transistor 13 off. Accordingly, if the ignition switch is turned off after the headlamp switch is turned off, headlamp switch 3 can be turned on and then off again and no delay occurs.

Consider now the following switching sequence. First, ignition switch 4 is turned "on", next headlamp switch 3 is turned "on", (thereby charging capacitor 23) then ignition switch 4 is turned "off", and finally headlamp switch 3 is turned "off", removing battery voltage from the base of transistor 15. The positive voltage on capacitor 23 will be applied to the base of transistor 13 (through resistor 26) thereby energizing relay 5 by way of the coil 12, the collector circuit of transistor 13, and current limiting resistor 29. Relay contacts 7 and 9 and 6 and 8 will maintain the headlamps on. Energization of relay 5 disconnects transistor 21 and diode 28 from the battery, and therefore capacitor 23 will proceed to discharge through the parallel combination of resistor 25 and the base circuit of transistor 13 which includes the series combination of resistors 26 and 29 along with the emitter-base path of transistor 13. This discharge time constant is set by the resistance and capacitance values to keep transistor 13 turned on for about 30 seconds or whatever headlamp delay period is desired. When capacitor 23 discharges to a voltage that will no longer keep transistor 13 conducting, relay 5 will deenergize thereby turning the headlamps off.

DESCRIPTION OF THE INVENTION

Thus far the description of the circuit operation has shown a normal headlamp delayed off operation that can be invoked by turning the headlamp switch off after the ignition switch is turned off. It can be seen that if the headlamps are turned back on, capacitor 23 will again charge and the delayed off will recur when the switch is subsequently turned off. The improvement of this invention is in the charge control circuit for capacitor 23. It can be seen that when the ignition switch 4 is turned off to invoke the delayed-off sequence, the source of charge for capacitor 18 is removed and it will start to discharge. Capacitor 18 will discharge through the base of transistor 21 and is adjusted in value to provide a suitable time constant, typically about 50 seconds. Once capacitor 18 becomes discharged, transistor 21 is turned off and capacitor 23 will no longer remain charged. Once capacitor 23 becomes discharged the delayed off interval is reduced to zero. Thus the delayed-off feature can be invoked only within a predetermined time interval after the ignition switch 4 is turned off. This means that headlamp operation is normal except for the specific interval and the delayed-off feature must therefore be deliberately produced by the operator before it is operative.

The following list shows a set of component values that have produced successful operation of the circuit shown in the drawing:

Transistor 13 — 2N 5306 NPN Darlington
Capacitor 14 — .047 microfarad
Transistor 15 — NPN General Electric Type 16E3218
Resistor 16 — 680 K ohms
Resistor 17 — 47 K ohms
Capacitor 18 — 10 microfarads
Diode 19 — 1N 914
Resistor 20 — 10 K ohms
Transistor 21 — NPN General Electric type 16E3218
Resistor 22 — 1 K ohms
Capacitor 23 — 50 microfarads
Resistor 24 — 2.7 K ohms
Resistor 25 — 620 K ohms
Resistor 26 — 470 K ohms
Resistor 27 — 680 K ohms
Diode 28 — 1N 914
Resistor 29 — 22 ohms While the above description relates to a preferred transistorized embodiment, those skilled in the art will recognize that other means may be employed to achieve the desired result. For example certain of the relay functions could be replaced with solid state devices. Also other circuit configurations could be employed to produce the same effect. It is intended that the invention be limited only by the following claims.

I claim:

1. In an automotive electrical system comprising headlamps, a battery connected in said system for operating said headlamps, a headlamp switch connected in said system for making and breaking said connection between said battery and said headlamps, and an ignition switch having first and second terminals and an off position and an on position, said first terminal of said ignition switch being connected to a terminal of said battery,
   a. switching means connected across said headlamp switch and operative, for a first predetermined period of time after said headlamp switch has broken said connection, to bypass said headlamp switch thereby to continue the current supplied to said headlamps, said switching means being connected to said second terminal of said ignition switch and being operative only when said ignition switch is turned from said on position to said off position prior to operating said headlamp switch to break said headlamp connection, and
   b. control means, connected to said switching means and operated from said ignition switch, for reducing said first predetermined period of time to substantially zero at a second predetermined period of time after said ignition switch has been turned from said on position to said off position.

2. The system of claim 1 wherein said second predetermined period of time is substantially longer than said first predetermined period of time.

3. The system of claim 1 wherein said first predetermined period of time is established by the discharge of a first capacitor connected into said switching means, and said second predetermined period of time is established by the discharge of a second capacitor connected into said control means.

4. In a circuit for use in an automobile having a battery, headlamps connected to said battery, an ignition switch connected to said battery, and a headlamp switch connected to make and break said connection between said battery and said headlamps, said circuit having switching means connected across said headlamp switch, said switching means including a first delay circuit for introducing a time delay between the act of turning said headlamp switch off and the extinguishing of said headlamps, said switching means being actuated only when said ignition switch is turned off prior to said act of turning said headlamp switch off, the improvement comprising:
   control means connected to said switching means for reducing said time delay to substantially zero, said control means including a second delay circuit connected to automatically reduce said time delay at a predetermined time after said ignition switch is turned off.

5. The circuit of claim 1 wherein said predetermined time is longer than said time delay.

* * * * *